United States Patent [19]

Cazin

[11] Patent Number: 5,785,002
[45] Date of Patent: Jul. 28, 1998

[54] SUBMERSIBLE BREEDING STRUCTURE

[76] Inventor: Bernard Cazin, 16 rue du Vercors, 69960 Corbas, France

[21] Appl. No.: 765,318
[22] PCT Filed: Jun. 28, 1995
[86] PCT No.: PCT/FR95/00857
  § 371 Date: Dec. 24, 1996
  § 102(e) Date: Dec. 24, 1996
[87] PCT Pub. No.: WO96/00500
  PCT Pub. Date: Jan. 11, 1996

[30] Foreign Application Priority Data

Jun. 30, 1994 [FR] France .................. 94 08507

[51] Int. Cl.⁶ ............................................ A01K 61/00
[52] U.S. Cl. .................... 119/223; 119/221; 119/238
[58] Field of Search ........................... 119/223, 221, 119/207, 208, 238, 239

[56] References Cited

U.S. PATENT DOCUMENTS 3,118,424  1/1964  Willinger .
3,540,415  11/1970  Bromley .
4,441,453  4/1984  McMickle et al. ............. 119/221

FOREIGN PATENT DOCUMENTS 564638   7/1960  Belgium .
362024050 B  5/1987  Japan ..................... 119/221
402069124 A  3/1990  Japan ..................... 119/221
2109929  4/1990  Japan .
404053433 A  2/1992  Japan ..................... 119/221

*Primary Examiner*—Michael J. Carone
*Assistant Examiner*—Yvonne R. Abbott
*Attorney, Agent, or Firm*—Wall Marjama & Bilinski

[57] ABSTRACT

A submersible structure for breeding piscicultural species in any aquatic environment that includes at least one frame member shaped and devised to accommodate a plurality of bunches of fibers. A series of frame members containing bunches of fibers can be connected and/or stacked to form modules in which the fibers can collect fish eggs. Preferably, the structure includes buoys which allow the structure to be positioned in medium-depth water, relative to the bottom of the aquatic environment.

15 Claims, 5 Drawing Sheets

SUBMERSIBLE BREEDING STRUCTURE

The invention relates to the technical field of breeding fish, especially Cyprinidae which live in freshwater, rivers, canals, lakes, gravel-pits and all aquatic environments.

Usually, this type of fish reproduces naturally on submerged aquatic vegetation. The disappearance of this higher vegetation in aquatic environments reduces the bio-mass for these species considerably. This aquatic flora also provides shelter for a multitude of micro-organisms and macro-invertebrates which are a food source for fish.

In order to overcome these disadvantages, a proposal has been made to construct shelters along the banks of rivers designed to encourage the reproduction of fish. These shelters are produced in the form of assemblies made of concrete or a similar material which are also submersed and can incidentally be used to support the banks of the river bed. This type of shelter is admittedly useful but is expensive and very difficult to transport, thus limiting the conditions under which it can be used.

SUMMARY OF THE INVENTION

The object of the invention was to produce a new design for a structure that encourages the spawning of fish and which, being of simplified design, can be constructed and moved quickly as needed.

Another object of the invention was to produce a submersible structure which encourages the spawning of fish, but at a relatively affordable cost price and in highly adaptable module form to meet the observed needs.

These objects and others will be apparent from the description below.

According to a first characteristic of the invention, the submersible structure for breeding piscicultural species in any aquatic environment is characterised in that it comprises at least one frame shaped and devised to accommodate a plurality of bunches of fibres, said frame accommodating means of ballasting and floating means of suspension which make it possible to position the frame(s) in medium-depth water.

BRIEF DESCRIPTION OF THE DRAWING

The object of the invention is illustrated in a non-exhaustive manner in the Figures in which.

DETAILED DESCRIPTION OF THE INVENTION

Figure 1:
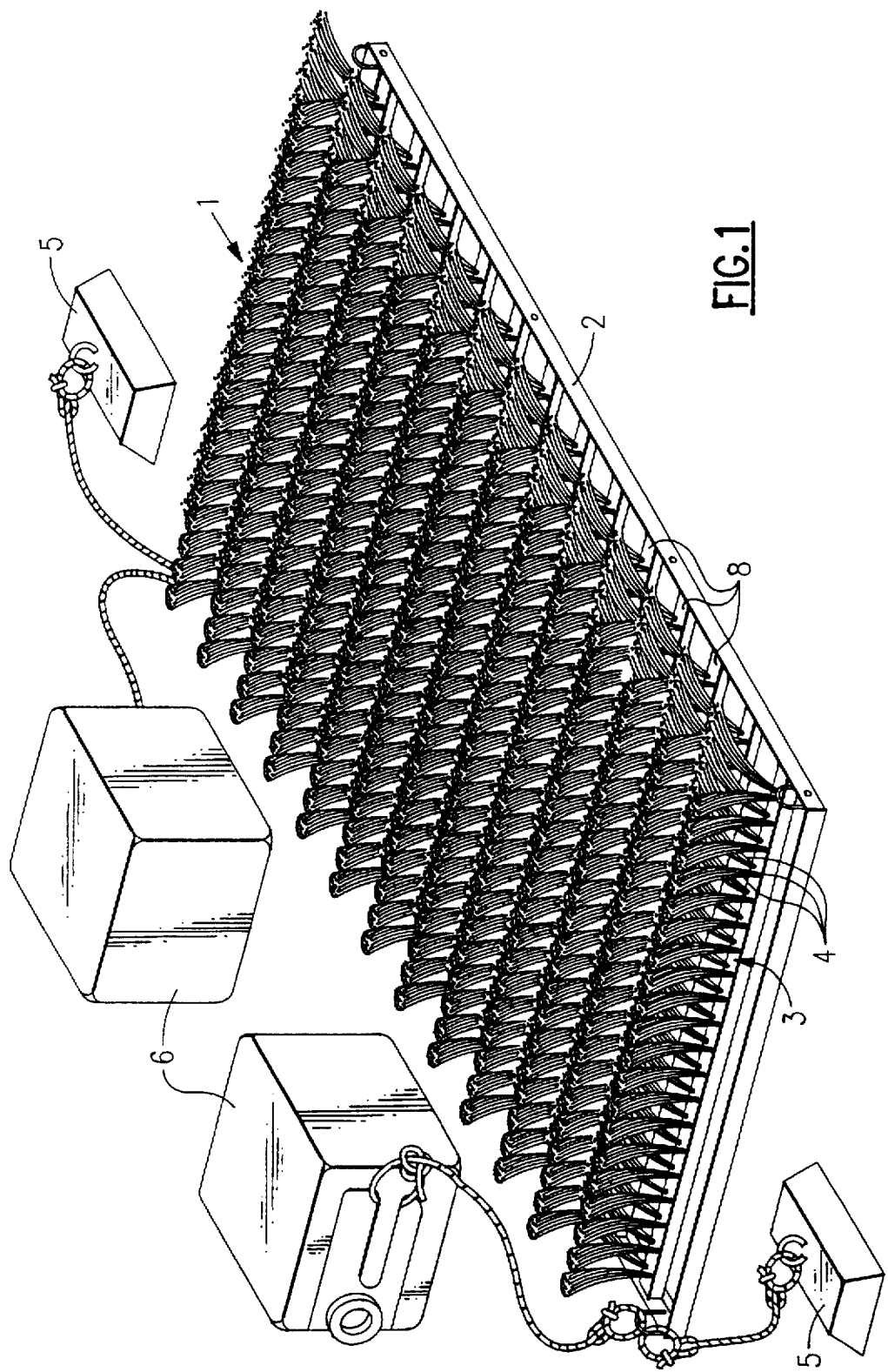
FIG. 1 is a perspective view of a module of a submersible structure according to the invention.

In order to make the object of the invention more apparent, it is described non-exhaustively, with reference being made to the Figures.

The submersible structure used to encourage the spawning and reproduction of fish, especially Cyprinidae, is referred to in its entirety as (1). This structure can be submersed in freshwater, river water, running water, calm water or lakes, gravel-pits, canals, the sea and, generally speaking, in any aquatic environment. It comprises a frame (2) shaped and devised to directly accommodate a separately mounted plurality of bunches (3) of fibres (4) made of an appropriate material, said frame accommodating means of ballasting (5) and floating means of suspension (6) used to position the frame in medium-depth water relative to the bottom of the lake, river or similar environment.

Figure 5:
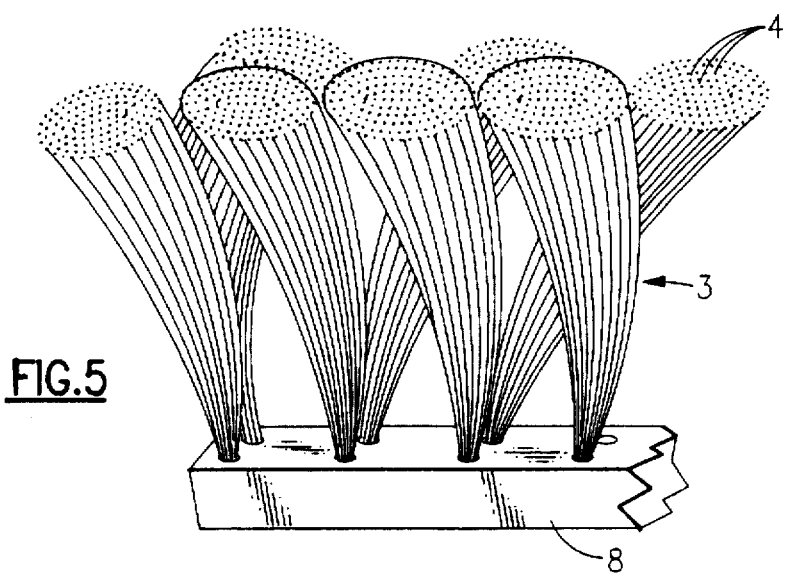
FIG. 5 is a large-scale view showing several bunches of fibres.
Figure 6:
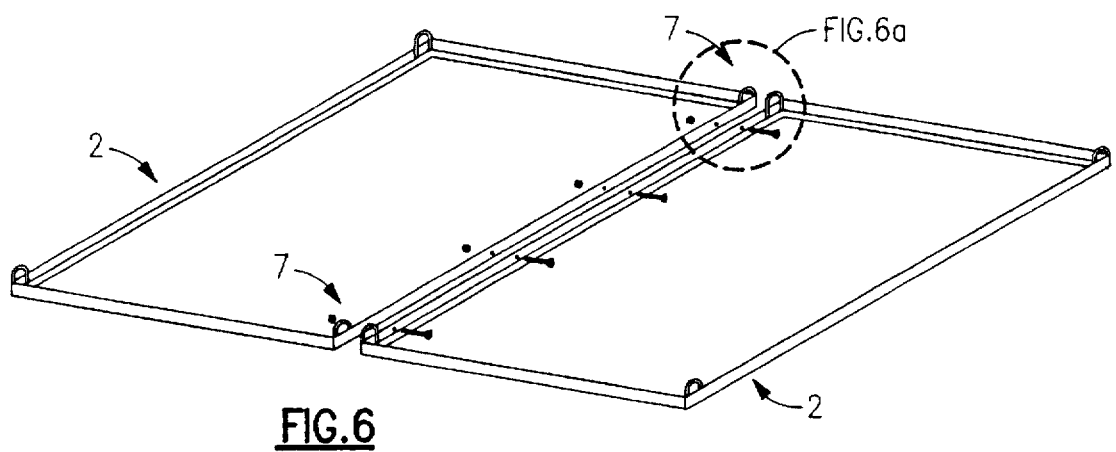
FIG. 6 is a partial view of a frame that accommodates a plurality of bars that support bunches of fibres.
Figure 6A:
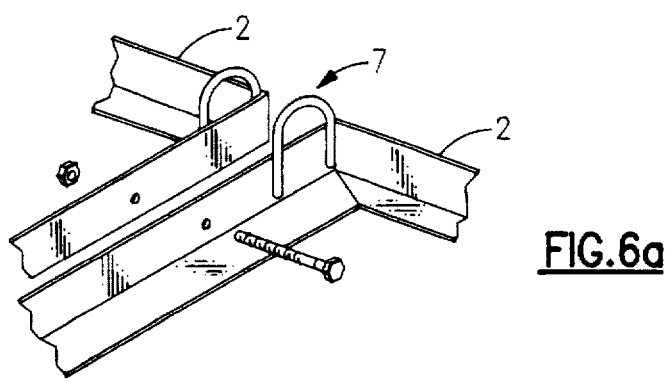
FIG. 6A is a large-scale view of a detail in FIG. 6.

This frame (2) forming a framework is made, for example, from metal angle sections or other material that has been treated to protect it against corrosion taking into account the environment in which it is used. Referring to FIGS. 6 and 6A, this frame is devised in the form of modules which can be placed side by side using appropriate means of securing, connecting and fixing (7). Each frame can have a rectangular, square, circular or other shape and accommodates, crosswise or, if applicable, around its periphery, shaped strips (8) FIG. 1, to which the bunches of fibres are fixed which are preferably made of a synthetic material. Each bunch as shown in FIG. 5, constitutes a branch that can be produced with a very large number of fibres of the order of 100 to 500 fibres, for instance, as required. These branches of fibres are arranged at intervals along above-mentioned strips and are fixed to the latter by any appropriate means of connecting and anchoring. The fibres are therefore secured at their base as shown in FIG. 5, with their other end being unattached so that they are able to move with the currents or movements in the aquatic medium as dictated by the natural environment. Said fibres are made of a synthetic plastic material from aramide or other fibres and, more generally, they are made of a material that is compatible with the aquatic environment. These fibres can be natural. The fibres are not destructible themselves, thus ensuring an adequately prolonged service life to meet the required needs.

The layout of the branches and fibres can be devised in any appropriate way and their support strips can be made of a plastic material such as polyvinyl chloride or polypropylene in particular. The length of the fibres is determined appropriately to produce a kind of aquatic forest making it possible, because of the very large number of strands and the number of bunches or branches, to create an area that encourages the reproduction of fish. The number of strips per frame and the number of branches per strip is determined in accordance with needs. The drawings show, non-exhaustively, frames of rectangular shape but the frame can be of any other shape.

The colour of the fibres is advantageously chosen to blend harmoniously into the environment in question. The fibres can be dark green or any other colour.

The usefulness of such an arrangement is also the fact that the fish eggs can adhere to and be securely held between the above-mentioned fibres.

The various frames can be physically joined to each other to form modules by means of fasteners such as screws, nuts or other fasteners that fit into appropriate fastening lugs.

The choice of fibres and materials that constitute the structure is determined to ensure they withstand the conditions in the aquatic environment satisfactorily.

Figure 2:
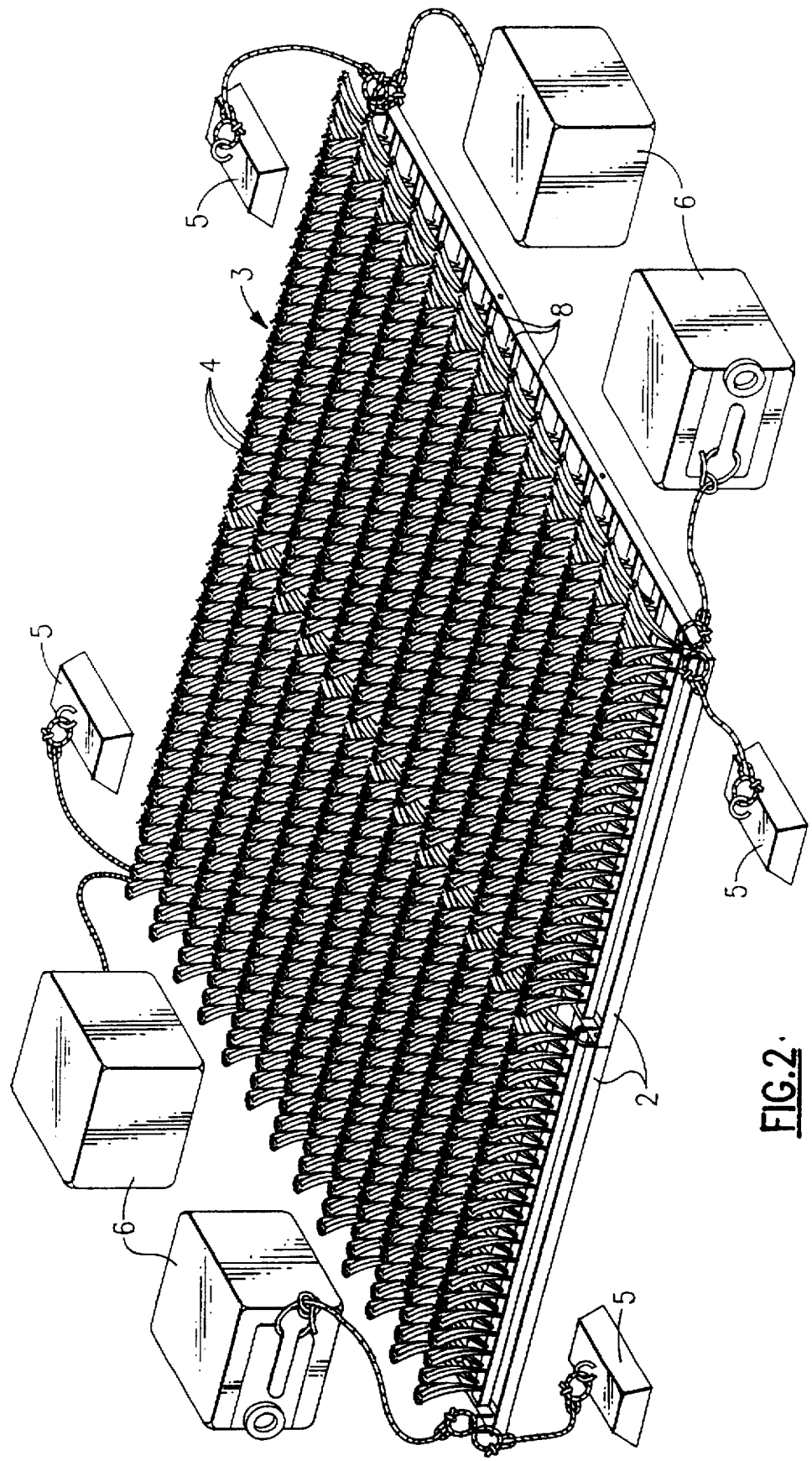
FIG. 2 is an alternative view of a double module in accordance with FIG. 1.
Figure 3:
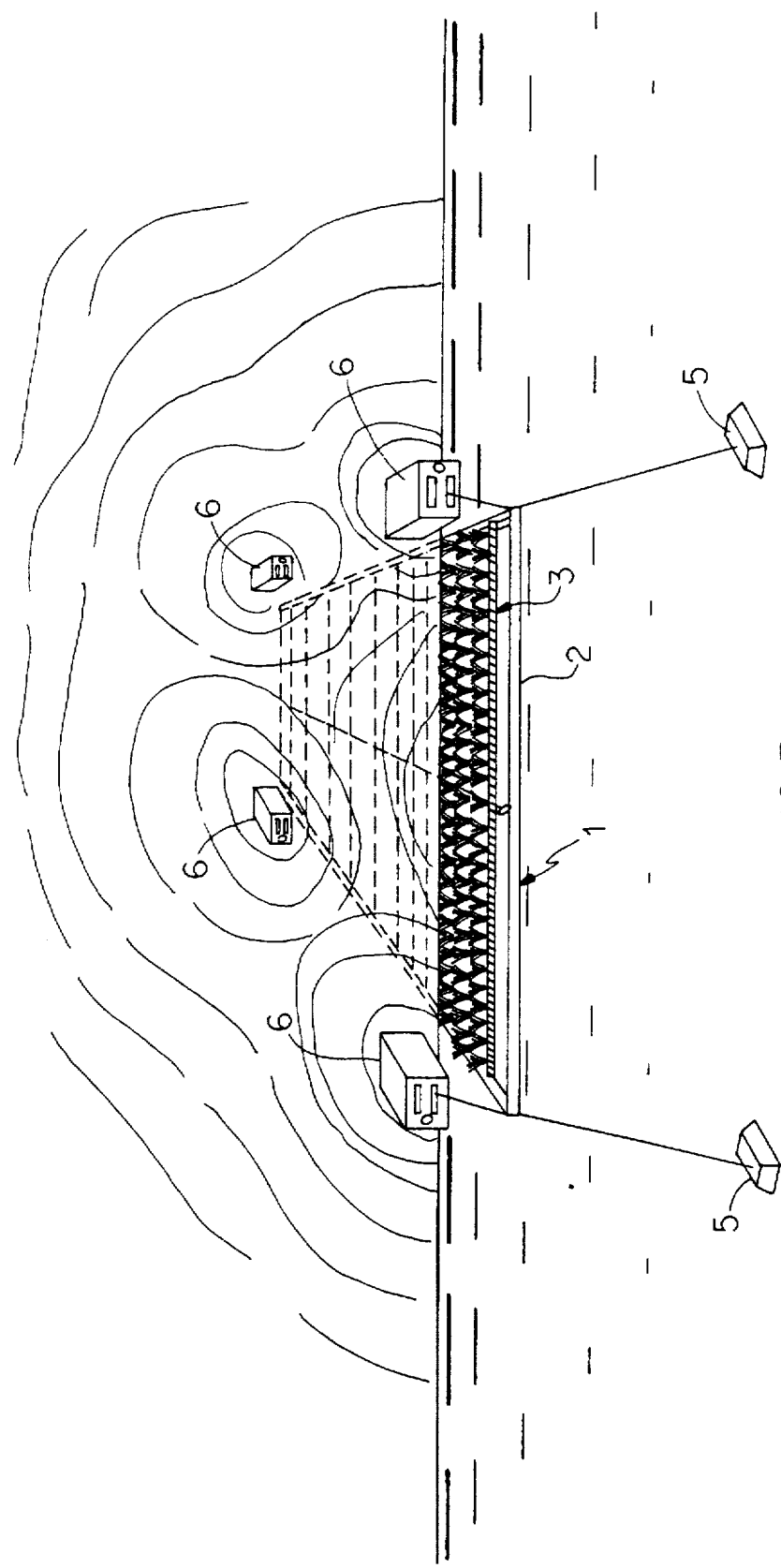
FIG. 3 is a schematic view showing the deployment of a structure in the water.
Figure 4:
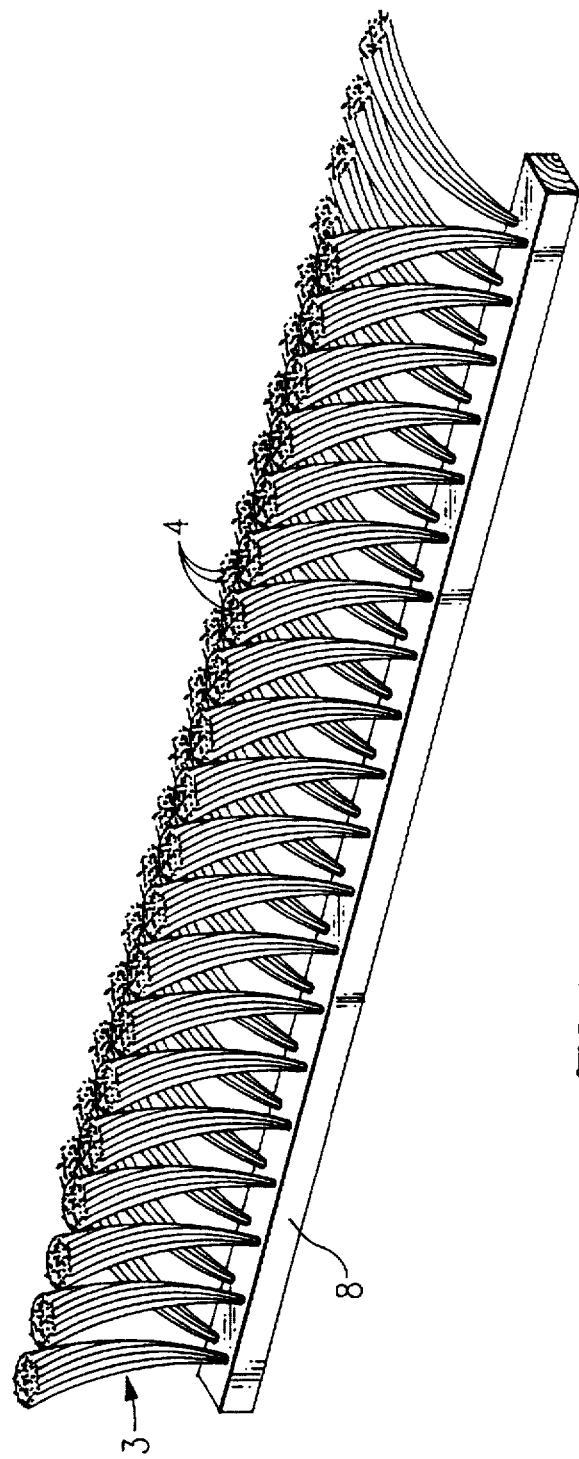
FIG. 4 is a view of a strip that accommodates a plurality of bunches of fibres that allow the reproduction of fish.

The buoys (6) and means of ballasting 5 are connected to said basic structure by ropes, chains or equivalent (8). Advantageously, the buoys are arranged at the corners of the structure so that the area in which said structures are deployed can be visually identified as shown in FIGS. 2 and 3.

The advantages are clearly apparent from the invention. The extreme adaptability of the submersed structured, the ability to position it as needed and the ease with which any operator can position the structure(s) thus designed without any particular difficulty at any location or distance from the bank are emphasised. The position of the frame(s) in terms of depth is also determined as needed and taking into account the depth of the aquatic environments. The buoys can be designed with display symbols allowing anyone to identify their position.

According to the invention, the bunches of fibres may, if applicable, be modified or replaced. It is also possible to add bunches of fibres as needed by fixing them by any appropriate means.

In an alternative embodiment, it is feasible to imagine such floating structures being deployed in a stacked configuration with clearances between the various frames so as not to obstruct the movement and reproduction of fish.

The invention is simple to implement, its cost is relatively affordable and it requires no special-purpose preparation of river beds or any areas that are used to site such structures.

I claim:

1. A submersible structure for breeding pisicultural species in any aquatic environment, said structure comprising:

at least one frame member;

means of ballasting said at least one frame member; and means for suspending said at least one frame member so as to allow said member to be positioned in medium-depth water, relative to the bottom of an aquatic environment wherein said structure includes a plurality of strips attached to said frame member, said bunches of fibers being fixedly attached at one end to said plurality of strips, and said bunches of fibers being unattached at an opposite end thereof, each of said plurality of strips extending across a major dimension of said at least one frame member.

2. A structure as recited in claim 1, wherein said fibers are made from a plastic material.

3. A structure as recited in claim 1, wherein said fibers are made from a natural material.

4. A structure as recited in claim 1, wherein said strips are made from a plastic material.

5. A structure as recited in claim 4, wherein said strips are made from polypropylene.

6. A structure as recited in claim 1, wherein each of said bunches of fiber contain approximately 100 to 500 individual fibers.

7. A structure as recited in claim 1, including at least two frame members, and means for interconnecting said at least two frame members together to form at least one module.

8. A structure as recited in claim 7, wherein said modules can be formed into different shaped configurations.

9. A structure as recited in claim 8, wherein said module has a shape having at least two corners, wherein said suspending means includes buoys arranged at said at least two corners.

10. A structure as recited in claim 1, wherein said suspending means includes buoys attached to said at least one frame member.

11. A structure as recited in claim 10, wherein said buoys include display and identification symbols.

12. A structure as recited in claim 1 wherein said bunches of fibers contain means for retaining fish eggs for allowing spawning and reproduction of fish.

13. A structure as recited in claim 1 wherein said aquatic environment contains fresh water.

14. A structure as recited in claim 1 wherein said aquatic environment contains saltwater.

15. A structure as recited in claim 1, wherein said fibers are dark green in color.

* * * * *